United States Patent
Nyberg et al.

[11] Patent Number: 5,647,304
[45] Date of Patent: Jul. 15, 1997

[54] METHOD AND A DEVICE FOR IMPROVING COMBUSTION PROCESSES

[76] Inventors: Leif Nyberg; Peter Nyberg, both of Klokergränd 8, 954 34 Gammelstad, Sweden; Bengt-Olov Robertsson, Rodervägen 11, 940 28 Rosvick, Sweden

[21] Appl. No.: 553,414

[22] PCT Filed: May 24, 1994

[86] PCT No.: PCT/SE94/00481

§ 371 Date: Nov. 22, 1995

§ 102(e) Date: Nov. 22, 1995

[87] PCT Pub. No.: WO94/28291

PCT Pub. Date: Dec. 8, 1994

[30] Foreign Application Priority Data

May 22, 1993 [SE] Sweden .................... 9301754-9

[51] Int. Cl.$^6$ .................................................. F02B 75/12
[52] U.S. Cl. ...................... 123/1 A; 123/585; 431/10
[58] Field of Search ........................... 123/1 A, 585, 123/586, 587, 588; 431/4, 10

[56] References Cited

U.S. PATENT DOCUMENTS

| | | | |
|---|---|---|---|
| 3,958,538 | 5/1976 | Hoshino | 123/1 A |
| 3,985,107 | 10/1976 | Ueno et al. | 123/1 A |
| 4,004,413 | 1/1977 | Ueno et al. | 123/1 A |
| 4,173,450 | 11/1979 | Schrank | 431/4 |
| 4,182,278 | 1/1980 | Coakwell | |
| 4,642,045 | 2/1987 | Provost | 431/4 |
| 5,105,772 | 4/1992 | Olsson et al. | 123/1 A |
| 5,400,746 | 3/1995 | Susa et al. | 123/585 |

*Primary Examiner*—Erick R. Solis

[57] ABSTRACT

The invention is directed to a method and a device for improving combustion in combustion processes and to achieve cleaner emissions. An oxidizer in gaseous form is introduced to metal-containing surfaces or surfaces onto which oxidizers can deposit in the combustion area or its proximity so that a direct convergence with the fuel feed and its admixture with air is obtained. The regulation of the flow supply is effected with an engine feedback control system. The following are also effected by the control system: the gaseous flow, the flow speed and concentration according to the engine load, motor speed, temperature, fuel consumption and gaseous emissions.

5 Claims, 1 Drawing Sheet

METHOD AND A DEVICE FOR IMPROVING COMBUSTION PROCESSES

FIELD OF THE INVENTION

The invention relates to a method of creating an active catalytic and cracking layer, through the introduction of an oxidizer in gaseous form to metal containing surfaces or surfaces onto which oxidizers can deposit in the combustion zone and/or in its vicinity, as well in the combustion zone as along the pathway of the gaseous emissions from the combustion zone and beyond to and through the gaseous emissions outflow. The invention also relates to a device for carrying out the invention.

BACKGROUND OF THE INVENTION

The carburetion of a fuel is a very important process within the field of energy technology since no fuel can burn without first being vaporized. Ordinarily the carburetion takes place conjointly with the combustion itself. If the fuel is already in gaseous form the combustion apparatus can be made simpler and thereby cheaper.

From U.S. Pat. No. 4,182,278, it is previously known to, in high compression combustion engines with multiple cylinders, regulate the air-fuel ratio in the combustion chamber of each cylinder to cope with ignition problems at high load, and to introduce to each cylinder a solution of hydrogen peroxide that is admixed to the air-fuel mixture in the combustion chamber.

SUMMARY OF THE INVENTION

Through introducing an oxidizer in gaseous form in accordance with the present invention one obtains not only an improvement of the combustion in combustion processes with increased engine efficiency as a consequence, but also cleaner emissions. The latter is especially important in the use of engine powered vehicles in for instance mines.

The catalyzer technique is a previous known technology for the cleaning of emissions from various combustion processes. In order to elucidate the problems that the invention proposes to solve entirely or in part, is given in the following a few examples of areas of application of the invention for instance combustion engines for automobiles, snowmobiles, outboard engines etc. The method is however applicable to all types of combustion.

For a catalyzer to function satisfactorily an emission temperature of between 600° C.–800° C. degrees is required. At temperatures below 600° C. and at temperatures exceeding 800° C. degrees it functions only partially which is unsatisfactory since the emissions then pass more or less straight out. At a temperature exceeding about 1060° C. degrees the catalyzer auto incinerates. In its exposed position for example underneath the vehicle the catalyzer is cooled down especially during winter time with reduced efficiency as a consequence. The cooling effects at highway speed are substantial.

City traffic, cold ignitions, winter climate and heavy engine load are disparate factors that totally or partially cause the catalyzer to stop functioning. Misfiring sends uncombusted fuel out to the hot catalyzer which then easily auto incinerates. Faults in the fuel system easily create problems, and so does bad fuel quality ignition misfiring, (worsened ignition properties) due to for example sooty ignition plugs are also a source of malfunctioning. Lead, soot and sticky hydrocarbons easily clog up a catalyzer.

It is difficult to keep a constant speed of 70 km/h maintaining the even load which is required for the catalyzer to reach its optimal efficiency of about 95%. It consequently does not function very well in city traffic where high cleansing rates really are needed. When accelerating quickly (when giving full throttle quickly) the lambda probe is put out of function for a few seconds and as a consequence uncombusted fuel is sent out to a practically sizzling hot catalyzer. This is one of the reasons for the manifold increase of platinum content in road dirt during the last five years according to conducted studies.

To move the catalyzer device closer to the engine in order to achieve quicker ignition is standard. However doing that one at the same time increases the back pressure which deteriorates the engine performance, efficiency and life span. Moreover, the fuel consumption is increased by 2–5% which increases the carbon monoxide emissions. Measurements have shown that a stretch of about 8 km of driving is necessary to reach a functional temperature (ignite the catalyzer). Two thirds of all car rides are less than 8 km which has as a consequence that a great deal of uncleaned emissions get out into the atmosphere even though the vehicle is equipped with a catalyzer.

A type of afterburner chamber has been developed that is installed just in front of the catalyzer. In a few seconds the latter is heated up to 350° C. degrees on an automobile. The fuel to this afterburner chamber comes through the exhaust pipe.

Because of the extra fat fuel mixture that the engine is supplied with at a cold ignition a residue of uncombusted fuel passes via the exhaust pipe to the chamber. Into it is also conducted extra oxygen and the mixture is ignited by a supplementary spark plug so that the catalyzer is heated up within a few seconds.

Through the introduction of an oxidizer in gaseous form containing one or several $H_2O_2$ molecules or a substance with equivalent efficacy/properties into the combustion gases these are immediately ignited by formed catalytic/cracking surfaces or by the catalyzer which thereby more quickly reaches operating temperature and optimal functioning. During tests the catalyzer has been started up with the engine running at idle and with exhaust temperatures of between 70° C.–160° C. degrees. Reliability in running and durability are thereby improved markedly. It is possible to place a catalyzer on an arbitrarily chosen location even on the furthest end of the exhaust pipe. The engine releases extremely minute quantities of soot and extremely low emitted quantities of hydrocarbons, carbon monoxide, $NO_x$ and so on. The catalyzer obtains ideal conditions of functioning and the work load is evenly distributed.

From peripheral areas combustion wise, as for example along cylinder walls, under squish-edges etc. which normally exhibit a low degree of combustion and generate high exhaust emissions, a catalytic low temperature combustion is now started due to the invention (t<350° C.). Furthermore the aforementioned surface now stimulates electron emissions that facilitate the ignition itself of the combustion. This emission of electrons also has a cracking effect on lengthy chains of hydrocarbons. The combustion simply takes place more efficiently without any soot and uncombusted residue problems. Thanks to the catalytic combustion being "cold" the thermal production of nitrogen oxides is kept down whereby "lean-burn" is made possible. In this way it is possible to significantly increase the efficiency of the combustion. Evidently there remains after the combustion a minute quantity of exhaust emissions containing uncombusted fuel. These combustion gases/exhaust emissions have through the above mentioned reactions obtained properties responsible for their easy oxidation and terminal combustion upon contact with the next following catalytic surface. This reaction has a catalytic character which can be likened to a flameless combustion at low temperatures.

When accelerating (giving throttle) heavily all surplus fuel is combusted thanks to the more complete and quicker ignition. The three "process steps" in the thermal transition that ordinarily start from heat and move on to chemical reactions and finally to generation of mechanical power are reversed to start with and proceed from for instance cylinder walls that initiate a progressive volume increase i.e. density increase of the combustion gases. During the combustion's first phase CO is generated at the same time as a great pressure increase occurs. This pressure rise pushes the semicombusted fuel gases against for instance cylinder walls and those surface's catalytic/cracking properties.

An ordinary combustion is significantly more exothermic in its character at the same time as it is to slow. It heats up the cylinder walls and produces thermal nitrous oxides. This is the reason for the use of EGR-valves that give a reintroduction of a part of the emissions to the combustion chamber with the purpose of reducing the combustion temperature and thereby reducing $NO_x$-exhaust emissions. With the catalytic and cracking surfaces that are achieved according to the invention there occurs a quick catalytic combustion already at a very early stage in the combustion wise peripheral zones. This also initiates some advantageous surface reactions and effects. Examples of these advantageous reactions are quicker and better ignition of combustion substances, more even pressure distribution, counteracting of hydrogen enbrittlement at the same time as nitrogen is made to participate in a circular fashion in the combustion, less soot formation, lower combustion noise, lower fuel consumption, higher efficiency output and also electrical polarization of molecules. According to tests the fuel consumption diminishes by 10–25% whereby also the carbon dioxide emissions are diminished. Because of the low initial value of $NO_x$ and the optimally pretreated gaseous composition one does not acquire any di-nitrogen oxide problem from a subsequently following secondary catalyzer.

The described catalytic cracking effects are achieved by feeding, to target surfaces, combustible substances including oxidizers in gaseous form or oxidizer with one or several $H_2O_2$ molecules comparable efficacy properties. It occurs from a nearby container wherefrom one by means of pressure or vacuum achieves a gaseous extraction from the in a liquid state residing oxidizer. This gaseous flow is led admixed with air in adequate proportions via low friction hoses of a for the oxidizer suitable composition to "full-flow connections optionally with sacrificial anodes" that in their turn distribute the gaseous further in a suitable state of composition to injection nozzles manufactured out of aluminium. These are placed in a direct convergence with the fuel-feed itself and its admixing with the suction-intake air. It is of the utmost importance that the supply takes place at exactly the right point in time and in correct proportions. Therefore is used optionally, a from the engine feedback control system, that regulates on one hand the gaseous flow itself but also its speed and concentration according to and following the engine's lead, number of revolutions, temperature, fuel consumption and emitting exhaust emissions.

Activation of a chosen surface takes place amid other by the following:

$$Fe+H_2O_2 \rightarrow 7Fe-O-OH*+H*$$

$$Fe+HO_2* \rightarrow 7Fe-O-OH*$$

$$Fe+HO_2* \rightarrow 7FeO_2*+H$$

Prolonged continuous oxidation:

$$Fe+H_2O_2 \rightarrow 7Fe-O-OH+CO \rightarrow CO_2+OH$$

and/or through:

$$Fe+n(CO)+R \rightarrow Fe(CO)nR$$

$R=((CH_2)n, COO, OH NO_2, NHn)$ can be formed. When $n=5$ then $R=O$ Improved combustion efficiency for example through:

$$FeO_2*(\gamma Fe-O-OH)+CO_2 \rightarrow FeCO_3*(HFeCO_3*)$$

$$FeCO_3*(HFeCO_3*)+2Fe \rightarrow Fe_3C+O_2=(OH)$$

Stimulation and increased emission of electrons for example by:

$$Fe+3OH+3CO+(CH_2)n \rightarrow Fe((CH_2)nC_2O_4)_3$$

Thermal dissociation of oxidizer (example $nH_2O_2$) for example through:

$$H_2O_2 \rightarrow H*+HO_2*$$

$$\rightarrow H_2+O_2*$$

(One or both of the atoms can occur alone as so called "singlet oxygen")

which gives the following particular constituents:

$$H*, HO_2*, OH, OH*, O_2*, (^1O+O)$$

The method according to the invention was tested on a two-stroke engine mounted on a dyno-test stand/bench and the temperature curves shown in FIGS. 3 and 4 were obtained by measuring the temperature on this engine.

The test was carried out on a 440 cc two-stroke engine that is ordinarily used in snow-mobiles. Temperature probes where drilled in to 1 mm from the combustion chamber. The engine was run thoroughly hot before the test to be thereafter subjected to partial load according to a practical running cycle. The engine in standard condition is seen represented by the upper curves in the respective diagrams.

As evidenced from the curves the temperature drops along the cylinder walls and the inside of the cylinder head when the method is applied. It was shown that this temperature reduction gave a motor output that consistently lay more than 4% higher than for the corresponding standard engine. In spite of this the actual fuel consumption dropped by an approximate 15%.

Finally was tried out whether a catalyzer of a standard brand would start with the test engine running at idle. Here positive results where obtained. The catalyzer was connected via a pipe during the measurement, after the engine's terminal silencer. i.e. last in the chain of the emission system. The engine ran at idle and emitted about 126° C. in emissions temperature as measured 7 cm from the emission gate. The temperature just in front of the catalizer lay at approximately 70° C. degrees. In the span of a few seconds among others the CO value dropped from 1,26% by volume to 0.06% by volume. That the engine obtains a lower temperature of combustion is favorable in many respects.

The by percentage admixed oil can be reduced which among other things gives emission wise for the catalyzer less "PAH troubles" to take care of. The soot formation and $NO_x$-emissions are minimal not to say hardly measurable.

During the following winter the test-snowmobile was subjected to really hard running which transpired entirely without reproach. The catalyzer was then still in a state as good as new. From what the tests have shown it follows that it is fully possible to, with good results use a catalyzer on, for catalyzers emission wise difficult engine types.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
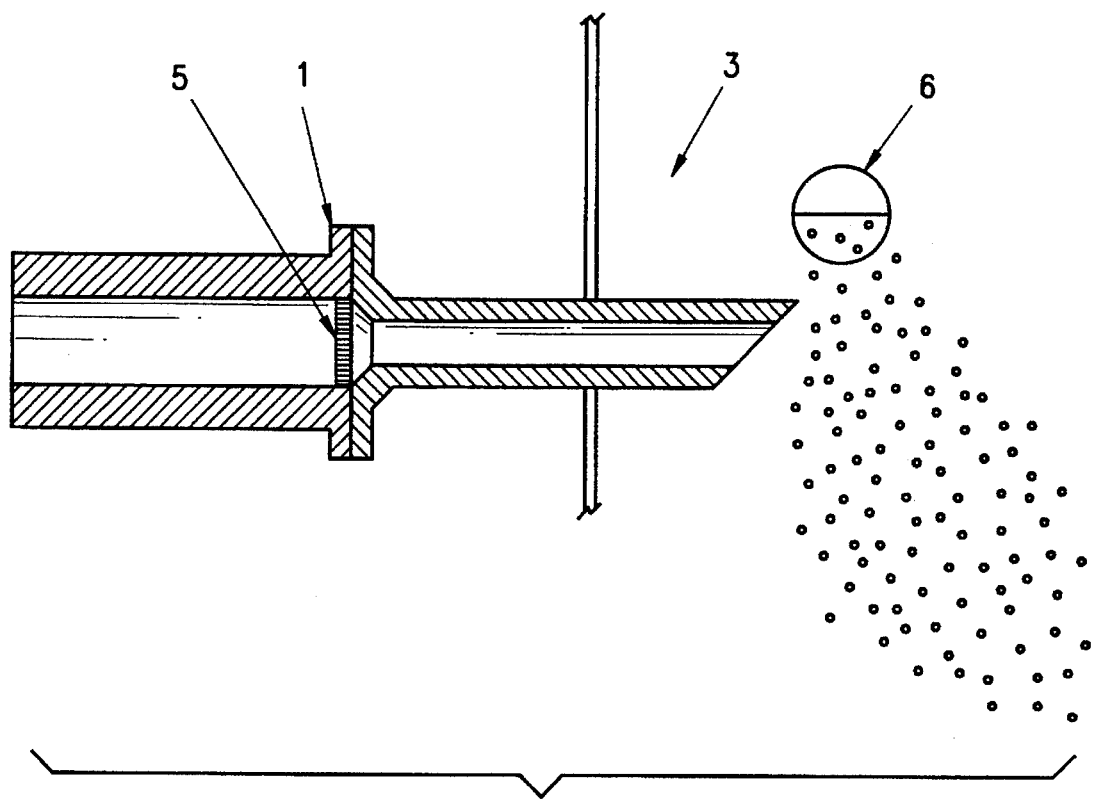
FIG. 1 is a schematic showing a jet spray nozzle in combination with a filter utilized in carrying out the method of the invention.

Through the installation in a jet spray nozzle in accordance with FIG. 1 of a semipermeable phase-filter, liquid can or if it is in aerosol form be made in a simple way to transform itself into adopting gaseous form. The shown filter consists of a stamped out ring of for instance Gore-Tex material but also other materials with corresponding properties can be used.

(Gore-Tex material can be used in many high tech contexts. The material is used for instance for the manufacture of rain clothes. The clothes become completely wind and water proof, meanwhile retaining an ability to "breath".)

In FIG. 1, 1 signifies an oxidizer nozzle suitably manufactured in aluminium. In front of the nozzle's tightening in the direction of flow of the oxidizer is seated a filter 5, which consists of a simple or multiple layered semipermeable phase transition membrane filter of for instance Gore-Tex type. A filter such as to facilitate the transition from liquid/aerosol-phase to gaseous-phase. In the space in front of the filter the oxidizer is extant in a liquid or aerosol form, which after the passage through the filter converts into gaseous which is sucked into the carburetor throat 3 directly converging with the from the out of the jet spray nozzle 6 in aerosol form outflowing air-fuel mixture.

Figure 2:
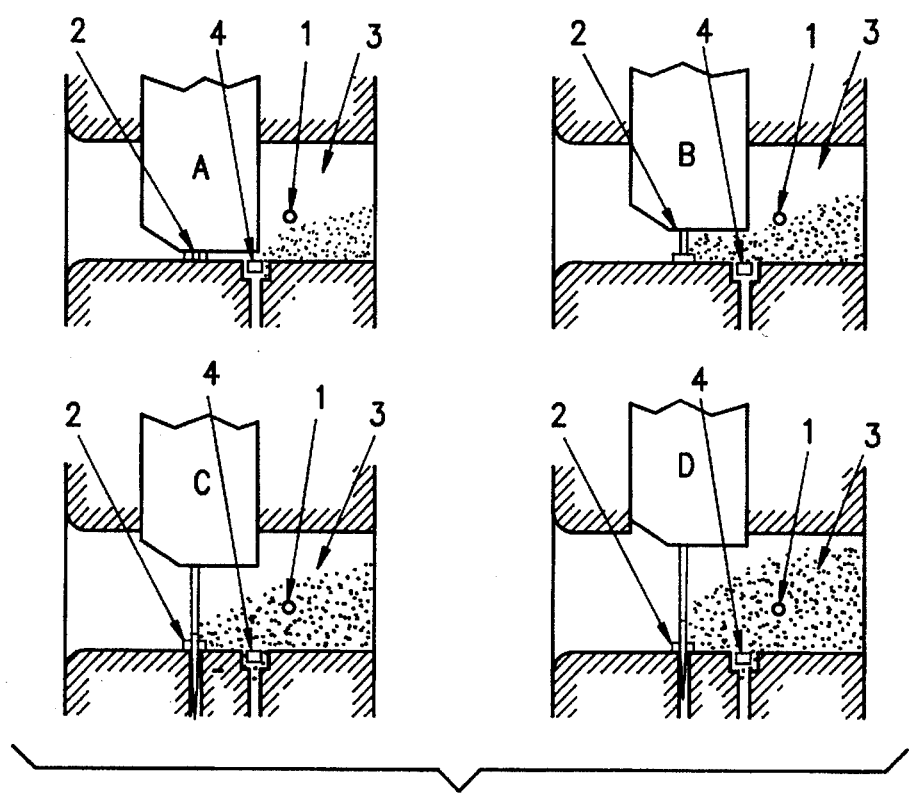
FIG. 2 shows the placement of the oxidizer jet spray nozzle in a throttle carburetor according to a feature of the arrangement of the invention with the throttle carburetor being commonly installed in two-stroke engines.

In FIG. 2, 1 signifies the oxidizer nozzle's orifice. A, B, C and D signify the by the throttle adjustable needle valve of a throttle carburetor in various positions. In the position A the needle valve 2 is closed and the air-fuel mixture is sucked into the carburetor throat 3 through the idle jet 4. In the positions B, C and D the needle valve 2 has opened, and the out of the main jet 1 in gaseous form outflow of oxidizer is directly converging with the in the carburetor throat in aerosol form extant air-fuel mixture.

With a semipermeable phase-filter the liquid/aerosol can easily be converted into gaseous form. The jet spray nozzle itself which is suitably manufactured out of aluminium is mounted on the intake lower pressure side of the fuel system which entails that one side of the filter is subjected to lower (negative) pressure whereby a powerful capillary action arises acting against its liquid/aerosol side.

Locating and shaping of the nozzle itself is of great import. It must have a position that corresponds to a convergence with the feed of the air-fuel mixture and its transition-phase/zone into aerosol form. This implies in practice that the oxidizer jet spray nozzle is placed approximately 5–30 mm after the carburetor's fuel-jet or needle valve (see FIG. 2.).

By a suitable aerodynamic shaping of the nozzle's orifice outlet one can among other things obtain advantageous "venturi-effects". Together with a carefully selected nozzle position one obtains in a suction engine(vacuum driven engine) in this manner a simple but effective regulation of the oxidizer feed itself, since the underpressure-suction and flow speed around the nozzle exactly follows the engine load and number of revolutions.

We claim:

1. A method for simultaneously supplying an oxidizer and an air/fuel mixture to a combustion chamber defining a combustion zone whereat combustion of the oxidizer and the air/fuel mixture takes place to form exhaust gases which are conducted to the ambient via an exhaust channel, the method comprising the steps of:

supplying the air/fuel mixture via first nozzle means to an inlet channel leading to said combustion zone;

providing second nozzle means and supplying said oxidizer to said second nozzle means;

converting said oxidizer to a gaseous form comprising at least one molecule of $H_2O_2$ in a concentration by volume of 5 to 99% in water and causing said oxidizer to flow from said second nozzle means into said inlet channel in said gaseous form;

positioning said second nozzle means relative to said first nozzle means so as to cause said oxidizer to converge and intersperse in said gaseous form directly with said air/fuel mixture to form a composite mix for combustion in said combustion zone; and, combusting said composite mix in said combustion zone to form exhaust gases including a predetermined product of combustion which deposits on the walls of said combustion chamber and said exhaust channel to form a quasi-permanent catalytic and cracking layer for trapping noxious components of said exhaust gases thereby cleaning the exhaust gases emitted to the ambient via said exhaust channel.

2. An arrangement for supplying an oxidizer and air/fuel mixture to a combustion chamber defining a combustion zone whereat combustion of the oxidizer and the air/fuel mixture takes place to form exhaust gases and other products of combustion which are conducted along an exhaust channel communicating with the ambient, the arrangement comprising:

an inlet channel leading to the combustion chamber;

first nozzle means opening into said inlet channel for injecting said air/fuel mixture thereinto;

a conduit terminating in a second nozzle means opening into said inlet channel;

supply means for supplying to said conduit an oxidizer in a liquid/aerosol phase comprising at least one molecule of $H_2O_2$ in a concentration by volume of 5 to 99% in water;

a filter mounted in said conduit and having a semipermeable phase transition membrane for facilitating a transition of said oxidizer from said liquid/aerosol phase to a gaseous form in which said oxidizer enters said inlet channel from said second nozzle means; and, said second nozzle means being mounted relative to said first nozzle means so as to cause said oxidizer to converge and intersperse with said air/fuel mixture to form a composite mix for combustion in said combustion zone to form exhaust gases including a predetermined product of combustion which deposits on the walls of said combustion chamber and said exhaust channel to form a quasi-permanent catalytic and cracking layer for trapping noxious components of said exhaust gases thereby cleaning the exhaust gases emitted to the ambient via said exhaust channel.

3. The arrangement of claim 2, wherein said inlet channel is an intake channel of a throttle carburetor; and, wherein said second nozzle means is mounted in said intake channel a predetermined distance downstream of said first nozzle means viewed in the direction toward said combustion chamber; said distance being in the range of 5 to 30 mm; and, said second nozzle having a diameter in the range of 1.5 to 2.5 mm.

4. The arrangement of claim 2, wherein said conduit defines a Z-axis and said filter is mounted in an XY-plane perpendicular to said Z-axis, said semipermeable phase transition membrane being configured so as to subject said oxidizer to surface tension in said XY-plane and to capillary forces along said Z-axis thereby increasing the amount of said oxidizer in said gaseous form.

5. The arrangement of claim 3, wherein the supply of said oxidizer to said conduit is regulated through the use of a feedback control system from the engine whereby the regulation occurs, on the one hand, because of the gaseous flow itself and, on the other hand, because of the speed of flow and its concentration following according to engine load, number of revolutions, temperature, fuel consumption and gaseous emissions.

* * * * *

UNITED STATES PATENT AND TRADEMARK OFFICE
CERTIFICATE OF CORRECTION

PATENT NO. : 5,647,304
DATED : July 15, 1997
INVENTOR(S) : Leif Nyberg, Peter Nyberg and Bengt-Olov Robertsson It is certified that error appears in the above-identified patent and that said Letters Patent is hereby corrected as shown below:

On the title page, below the Abstract: delete "5 Claims, 1 Drawing Sheet" and substitute -- 5 Claims, 2 Drawing Sheets -- therefor.

Figure 3:
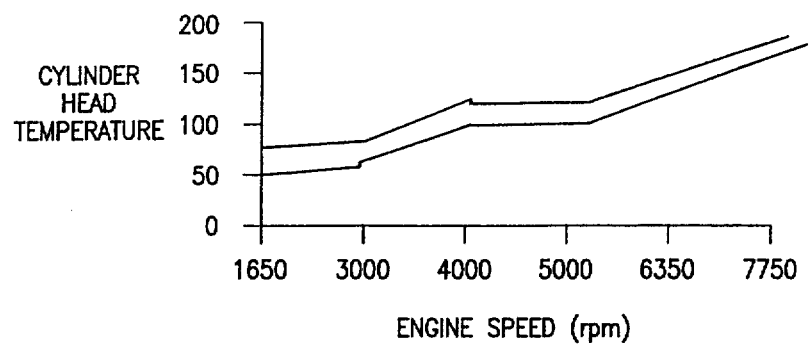
FIG. 3 is a graph showing the measurement of cylinder head temperature on a two-stroke engine as a function of engine speed (rpm); and, FIG. 4 is a plot of cylinder wall temperature for a two-stroke engine also plotted as speed (rpm).
Figure 4:
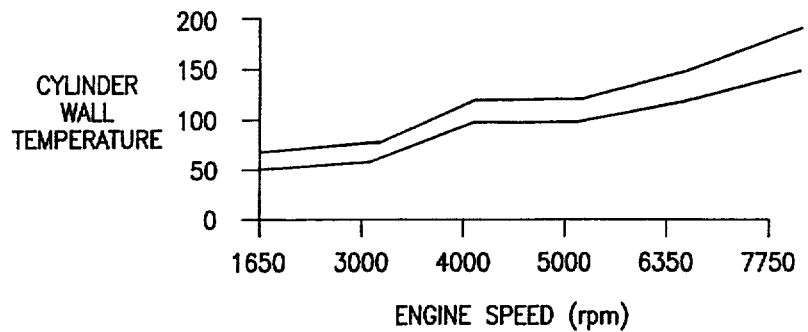

After Drawing Sheet 1, containing FIGS. 1 and 2: insert Drawing Sheet 2, FIGS. 3 and 4.

In column 3, line 61: delete "lead" and substitute -- load -- therefor.

In column 3, line 66: delete "Fe+H$_2$O$_2$→7Fe-O-OH*+H*" and substitute -- Fe+H$_2$O$_2$→γFe-O-OH*+H* -- therefor.

In column 3, line 67: delete "Fe+HO$_2$*→7Fe-O-OH*" and substitute -- Fe+HO$_2$*→γFe-O-OH* -- therefor.

In column 4, line 1: delete "Fe+HO$_2$*→7FeO$_2$*+H" and substitute -- Fe+HO$_2$*→γFeO$_2$*+H -- therefor.

In column 4, line 3: delete "Fe+H$_2$O$_2$→7Fe-O-OH+CO→CO$_2$+OH" and substitute -- Fe+H$_2$O$_2$→γFe-O-OH+CO→CO$_2$+OH -- therefor.

Signed and Sealed this

Twenty-ninth Day of September, 1998

*Attest:*

BRUCE LEHMAN

*Attesting Officer*     *Commissioner of Patents and Trademarks*